Sept. 9, 1958  G. H. DOERRIES  2,851,129
SPRING APPLIED ELECTRIC RELEASED BRAKE
Filed Dec. 15, 1955  3 Sheets-Sheet 1

INVENTOR
GEORGE H. DOERRIES
BY
Davis, Hoxie & Faithfull
ATTORNEY

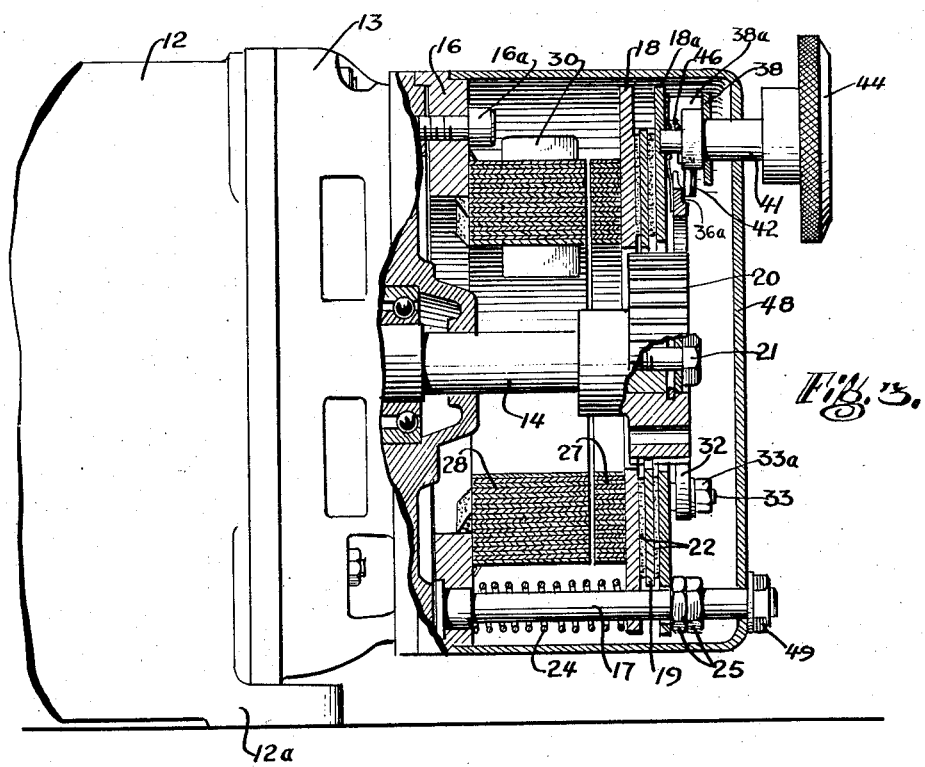
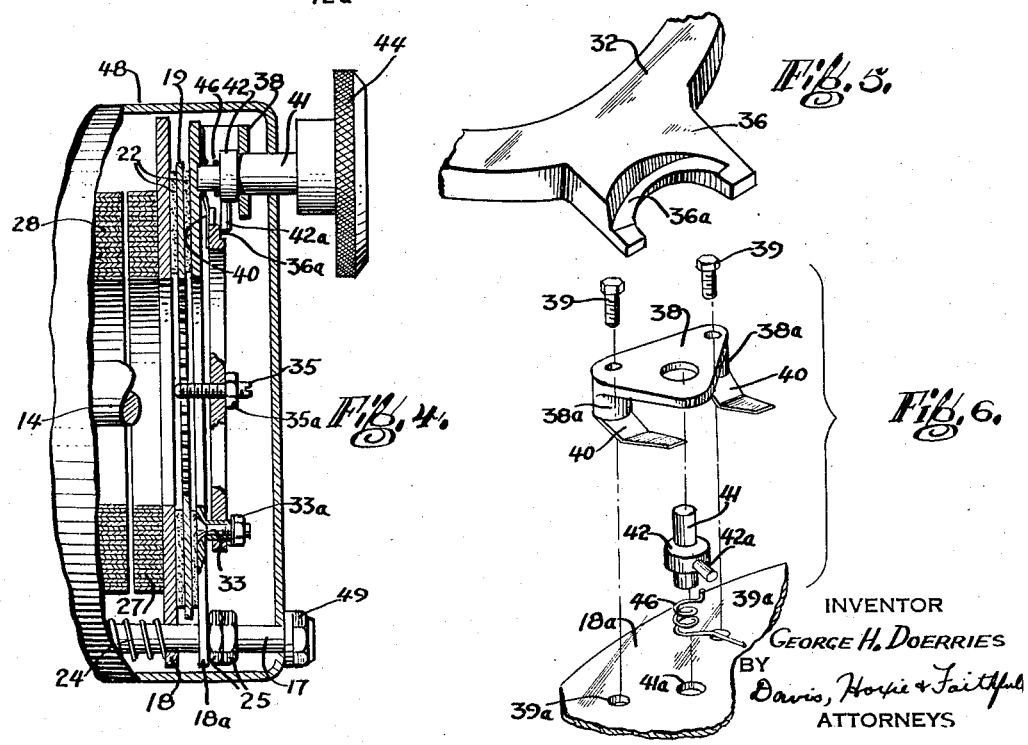

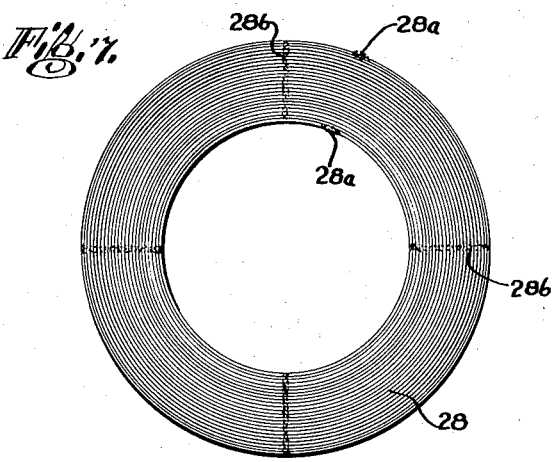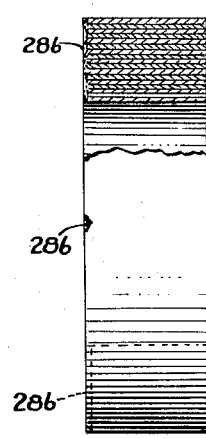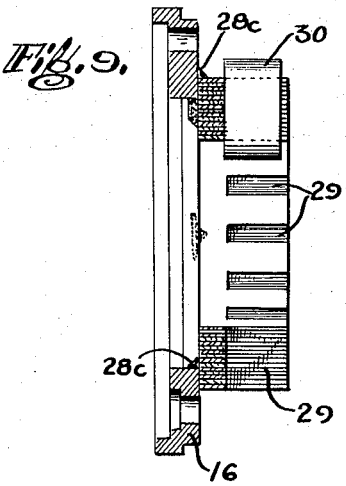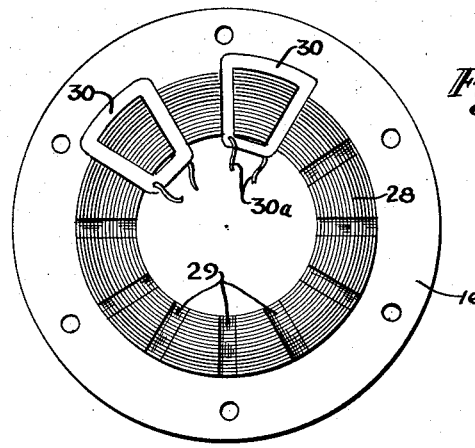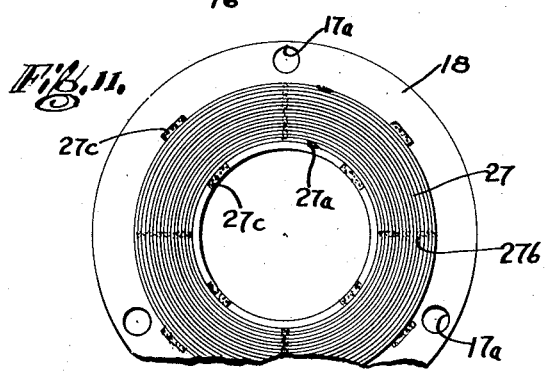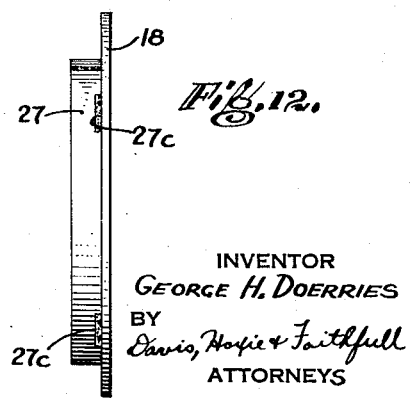

United States Patent Office 2,851,129
Patented Sept. 9, 1958

2,851,129

SPRING APPLIED ELECTRIC RELEASED BRAKE

George H. Doerries, West Caldwell, N. J., assignor, by mesne assignments, to Safety Industries, Inc., Hamden, Conn., a corporation of Delaware Application December 15, 1955, Serial No. 553,294

7 Claims. (Cl. 188—171)

This invention relates to electrically operated brakes of the type wherein the braking action is effected by axial movement of a non-rotating electromagnetically-controlled disc against a disc which rotates with the motor-driven shaft or other element to be braked. The invention has particular reference to an improved brake of this type in which the braking action can be released either by operation of the electromagnet or independently of the electromagnet.

The invention will be described for illustrative purposes in connection with an electric motor having a shaft which is to be braked when the motor is deenergized, although it is to be understood that the invention is applicable to other uses as well.

In a brake of the type with which the present invention is concerned, the non-rotating disc is pressed against the rotatable disc by a biasing means when the electric motor and the electromagnet are deenergized, thereby effecting the braking action. The brake is released by energizing of the electromagnet when the motor is restarted, whereby the electromagnet draws the non-rotating disc away from the rotatable disc against the action of the biasing means. In some instances, it may be necessary or desirable to rotate the motor shaft manually or in some other manner which is independent of the motor action as for adjustment purposes or when there is a failure of the motor or the electric power supply. However, such independent rotation of the motor shaft requires release of the brake against the action of the disc biasing means, and this cannot ordinarily be accomplished readily without energizing the electromagnet, which is impossible in the event of power failure.

The principal object of the present invention is to provide an electrically operated brake of the character described having a simple mechanism by which the brake can be released readily independently of the electromagnet, as in the event of power failure, and which automatically restores the brake to full control by the electromagnet when the latter is reenergized.

According to the invention, the electrically operated brake is provided with an actuator, such as a manually operable handle or knob. This actuator has an operative connection to the axially movable disc which is attracted by the electromagnet to release the brake. By means of this connection from the actuator, the latter is operable to displace the axially movable disc against the force of the biasing means independently of the electromagnet, this displacement being effected by movement of the actuator from a brake-setting position to a brake-releasing position. The brake also comprises means responsive to energizing of the electromagnet for returning the actuator to its brake-setting position, whereby the brake is automatically restored to full control by the electromagnet.

In the preferred form of the new brake, the operative connection between the actuator and the axially movable disc includes a pair of relatively movable elements which are interengaged under the pressure from the disc biasing means when the electromagnet is deenergized and the actuator is in its brake releasing position. Thus, this pressure between the relatively movable elements is adapted to hold the actuator frictionally against return to its brake setting position by the actuator returning means. However, when the electromagnet is energized with the actuator in its brake releasing position, the resulting displacement of the axially movable disc against the force of the disc biasing means will relieve the pressure on the operative connection between the actuator and this axially movable disc. Consequently, the pressure between the above-mentioned relatively movable elements of this connection will be relieved so as to reduce the friction between these elements, thereby allowing the actuator returning means to return the actuator to its brake setting position. This means that when the electromagnet is next deenergized, the disc biasing means will displace the axially movable disc against the rotatable disc to effect the braking action. The relatively movable elements which serve to hold the actuator frictionally in its brake-releasing position are preferably camming elements, one of which is connected to the actuator and movable thereby relative to the other element, so as to effect the brake-releasing displacement of the axially movable disc independently of the electromagnet.

The preferred form of the brake has a series of braking discs including at least one intermediate disc rotatable with the motor-driven shaft, the series also including non-rotatable end discs at opposite ends of the series. One of these end discs is movable axially of the shaft and forms an armature coacting with the electromagnet, while the opposite end disc serves to support the actuator and at least part of the operative connection between the latter and the armature disc. With this arrangement, it is possible to adjust the gap between the electromagnet and its armature without affecting the operative connection between the actuator and the armature disc. This adjustment can be made by means of adjustable stops against which the actuator-supporting disc is held by the action of the biasing means on the armature disc.

Another feature of the invention resides in the electromagnet which controls the brake. Preferably, the electromagnet comprises a coiled metal strip forming an annular core, the turns of the coil being notched to form generally radial slots in the core. These slots receive coils of magnet wire adapted for connection to the current source for energizing the electromagnet. The magnet core is preferably secured to a stationary ring surrounding the motor shaft and carrying studs which project through the non-rotating discs so as to support them for movement axially of the shaft. The armature of the axially movable disc adjacent the electromagnet may also be made of a coiled metal strip.

These and other features of the invention may be better understood by the following description and the accompanying drawings, in which, Fig. 1 is an end view of an electric motor embodying a preferred form of the invention;

Fig. 2 is a view similar to Fig. 1 but on an enlarged scale and with parts broken away to reveal the details of the brake;

Figs. 3 and 4 are sectional views on the lines 3—3 and 4—4, respectively, in Fig. 2;

Fig. 5 is a perspective view of part of the operative connection between the brake-release actuator and the axially movable disc adjacent the electro-magnet, this view showing one of the coacting camming elements of the connection;

Fig. 6 is an exploded view in perspective showing other details of the operative connection from the brake release actuator and also showing the returning means for this actuator;

Fig. 7 is a face view of the coil forming the core of the electromagnet;

Fig. 8 is a side view, partly in section, of the coil shown in Fig. 7;

Fig. 9 is a sectional view of the partly assembled electromagnet mounted on its supporting ring;

Fig. 10 is a face view of the electromagnet and the supporting ring shown in Fig. 9;

Fig. 11 is a face view of the armature and the end disc on which it is mounted, and Fig. 12 is a side view of the disc and armature shown in Fig. 10.

Figure 1:
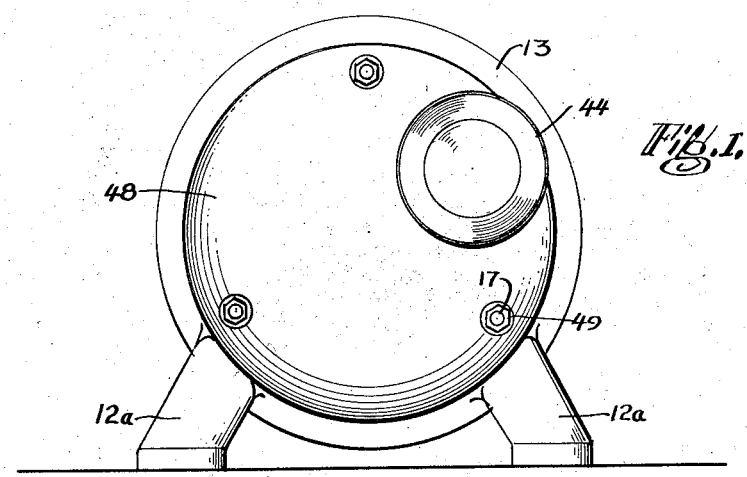

Referring to the drawings, the reference numeral 12 designates the housing of an electric motor of any suitable design, the housing having supporting legs 12a. A bell 13 at one end of the housing contains the usual bearing for the motor shaft 14 projecting from the rotor.

A ring 16 is secured to the end bell 13 by machine screws, one of which is shown at 16a (Fig. 3). The ring 16 carries three studs 17 spaced equidistantly about the outer peripheral part of the ring. These studs project outwardly from the end bell 13 and extend parallel to the motor shaft 14. A non-rotating disc 18 is located at one end of a series of discs and has holes 17a (Fig. 10) through which the studs 17 extend. These studs also extend through similar holes in a non-rotating disc 18a at the opposite end of the series of discs. Between the end discs 18 and 18a is an intermediate disc 19 which rotates with the motor shaft 14. The rotatable disc 19 is mounted on the shaft by means of a toothed wheel 20, the latter being releasably secured to the end of the shaft in any suitable manner, as by a machine screw 21. As shown particularly in Figs. 2 and 4, the intermediate disc 19 is of annular form and is provided along its inner edge with teeth 19a which mesh with the teeth of the wheel 20. In this way, the intermediate disc 19 is caused to rotate with the motor shaft 14 but is capable of axial movement relative to this shaft. The end discs 18—18a are also of annular form, their central openings being of sufficient diameter to provide a clearance around the toothed wheel 20.

A brake lining 22 is cemented or otherwise secured to each face of the rotatable intermediate disc 19, whereby these linings are engageable with the adjacent faces of the end discs 18 and 18a.

While I have shown only one rotating disc 19, it will be understood that any desired number of such discs may be provided in alternation with non-rotating discs, depending upon the braking action desired.

The end disc 18 is urged toward the opposite end disc 18a by a biasing means which comprises springs 24 coiled around the studs 17 and compressed between the supporting ring 16 and the disc 18. Outward movement of the discs by the springs 24 is limited by adjustable stop means in the form of lock nuts 25 threaded on the studs 17. Thus, the biasing means 24 normally press the discs 18—19—18a together against the stops 25 to provide the braking action.

An armature 27 is secured to the inner face of the end disc 18 and is formed by a coiled strip of steel or other magnetic material. As shown particularly in Figs. 10 and 11, the ends of the coil 27 are secured by welding 27a to prevent unwinding of the coil. Also, the coil is provided with generally radial welds 27b extending across the front face of the coil, this face being subsequently ground to provide a flat surface. The armature coil 27 is secured to the end disc 18 by additional welding shown at 27c.

The armature 27 coacts with an electromagnet comprising a core secured to the supporting ring 16 and formed by a coiled strip of steel or other magnetic material. The ends of the coil 28 are secured by welding 28a, and the front face of the coil is provided with generally radial welds 28b (Figs. 7 and 8). As in the case of the armature 27, the front face of the core coil 28 is ground to form a flat surface after the welding at 28b. The core 28 is secured to the adjacent face of the supporting ring 16 by welding which is indicated at 28c (Figs. 3 and 9), these weldings being located between the front face of ring 16 and the outer periphery of the core and also between the opposing face of the core and the inner edge of ring 16. The core 28, which is annular, has generally radial slots 29 extending from the front face of the core toward the supporting ring 16. These slots may be formed by notching the metal strip of the core before the strip is coiled, or they may be formed after coiling of the strip. The slots 29 are adapted to receive magnet coils 30, the latter consisting of coils of magnet wire which are suitably insulated and supported. As best shown in Fig. 10, each magnet coil 30 is of hollow truncated form and is mounted in two adjacent slots 29, there being 12 of such slots to accommodate six of these magnet coils. Each coil 30 has lead wires 30a adapted for connection to a source of electrical power (not shown) for energizing the electromagnet 28—30. The magnet coils 30 are arranged to be energized simultaneously with the electric motor 21, so that starting of the motor and release of the brake occur simultaneously.

With the construction as described, the brake is applied whenever the electromagnet 28—30 is deenergized. That is, the biasing springs 24 normally clamp the braking discs together against the adjustable stops 25. When the electromagnet is energized, it attracts the armature against the action of the biasing means 24, thereby relieving the pressure between the discs and releasing the brake. The normal gap between the electromagnet and the armature can be easily varied by means of the adjustable stops 25 engaging the outer end disc 18a. In this way, the operating characteristics of the brake can be adjusted, as will be readily understood by those skilled in the art.

Figure 2:
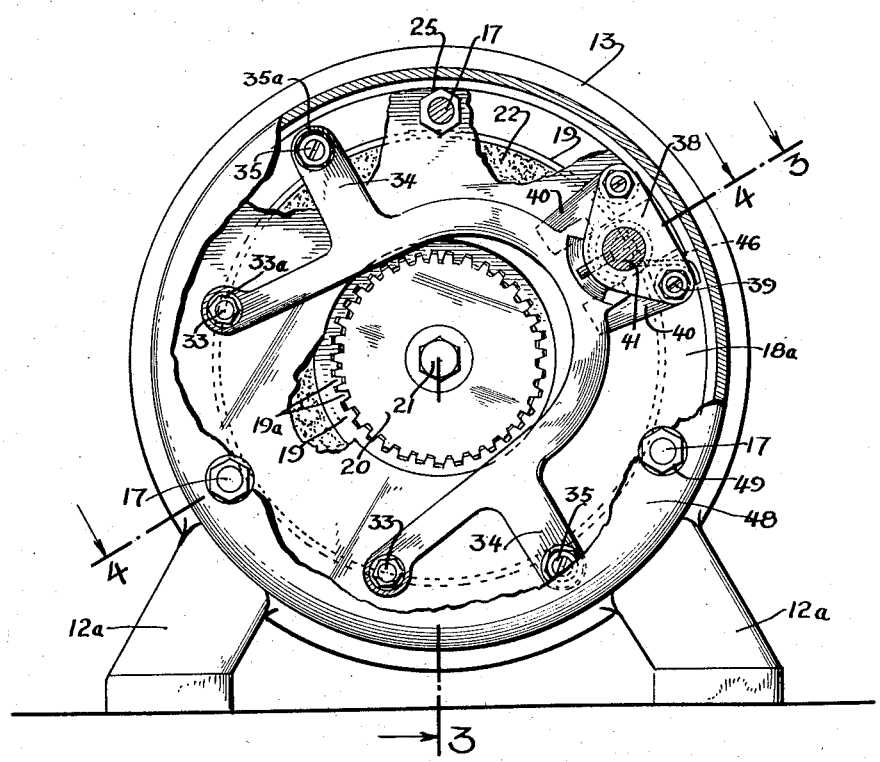

A brake release lever 32 is mounted on the outer face of the end disc 18a. As best shown in Fig. 2, this lever has a pair of legs which straddle the toothed wheel 20. The end portions of these legs are pivotally mounted on studs 33 secured to the end plate 18a, as by means of nuts 33a. The legs of the lever 32 are provided with arms 34 which project radially of the shaft 14 and to a greater radius than the outer periphery of the rotatable intermediate disc 19. At their free ends, the lever arms 34 carry studs or pins 35 which are threaded through these arms and extend inwardly through holes in the end disc 18a, the inner ends of these pins engaging diametrically opposed portions of the opposite end disc 18 (Figs. 2 and 4). The pins 35 are secured in adjusted positions on the arms 34 by nuts 35a.

The lever 32 has a head 36 where the lever legs are joined together (Fig. 5). The outer face of this head is formed with a cam surface 36a in the form of a ramp which extends through an arc.

A shaft retainer 38 is secured to the end disc 18a. This retainer has legs 38a which are seated against the outer face of disc 18a, the retainer being secured to the disc by machine screws 39 extending through the legs and threaded into holes 39a in the disc (Fig. 6). A leaf spring 40 is clamped between the disc 18a and the two legs 38a of the retainer, the leaf spring having holes through which screws 39 extend. An actuating shaft 41 extends through a central hole in the retainer 38 and is seated at its end in a recess 41a in the disc 18a. Thus, the actuating shaft 41 has a bearing in the disc 18a and also in the retainer 38. Between these two parts, the shaft 41 has an enlargement 42 provided with a radially extending pin 42a which engages the cam surface 36a of the lever.

The pin 42a and the cam surface 36a form interengaging camming elements adapted to swing the lever 32 in one direction or the other on its pivots 33, depending upon the direction of rotation of the actuating shaft 41.

The leaf spring 40 engages the lever head 36 so as to urge the lever outwardly (to the right in Fig. 4) at all times, whereby the cam surface 36a is maintained in engagement with the camming pin 42a. The leaf spring 40 thus serves to hold the lever 32 against rattling.

At its outer end, the actuating shaft 41 is provided with an actuator 44 in the form of a manually operable knob. This knob is rotatable between a brake-setting position and a brake-releasing position. In the brake-setting position, the camming pin 42a is at the low point of the camming surface 36a (Fig. 5), whereby the release lever 32 is held in its outermost position by left spring 40 (to the right in Figs. 3 and 4). Thus, the lever pins 35 are in their outermost positions so as to allow the disc biasing means 24 to press the discs together and exert a braking action whenever the electromagnet 28—30 is denergized. In other words, in this brake-setting position of the actuator knob 44, the brake is under complete control of the electromagnet in that the brake is set by the biasing means 24 when the electromagnet is deenergized but is released against the action of the biasing means when the electromagnet is energized.

By rotating the actuator knob 44 in one direction from its brake-setting position (clockwise in Fig. 1), the finger or pin 42a rides to the opposite or raised end of cam surface 36a and thereby forces lever 32 to the left about its pivots 33, as seen in Figs. 3 and 4. In thus turning the actuator 44 to its brake releasing position, the end disc 18 is forced inward by the lever pins 34 (to the left in Fig. 4) against the action of the biasing means 24, so as to release the brake independently of the electromagnet.

The brake is also provided with means responsive to energizing of the electromagnet 28—30 for automatically returning the actuator 44 from its brake-releasing position to its brake-setting position. The actuator returning means, as shown, comprise a torsion spring 46 coiled around the inner end of the actuating shaft 41 between the enlargement 42 and the end disc 18a. One end of this torsion spring 46 is secured to the shaft enlargement 42, while the other end is suitably anchored to the end disc 18a. As best shown in Fig. 6, the torsion spring 46 is provided at one end with a projection which fits into an opening (not shown) in the opposing face of the shaft enlargement 42. As shown in Fig. 2, the other end of this spring 46 is bent partly around one of the legs 38a of the shaft retainer 38. Consequently, the torsion spring 46 urges the actuating shaft 41 toward the brake-setting position (counterclockwise in Figs. 1 and 2). In other words, this spring tends to maintain the camming pin 42a at the lower end of the cam surface 36a.

It will be apparent that when the actuator knob 44 is rotated to its brake releasing position as previously described, the torsion spring 46 is wound tighter around the inner end of shaft 41. However, as long as the electromagnet 28—30 remains deenergized, the torsion spring 46 is prevented from returning the actuator to its brake setting position, due to the relatively heavy outward pressure of the cam surface 36a against the camming pin 42a. More particularly, it will be observed that when the actuator 44 is in its brake-releasing position with the electromagnet 28—30 deenergized, the full pressure of the disc biasing springs 24 is exerted on the operative connection between the actuator and the end disc 18, this connection comprising the actuator shaft 41 and its retainer 38, the camming elements 42a and 36a, the lever 32 and its pins 35, which engage the end disc 18. Accordingly, the camming elements 36a and 42a are pressed together with a sufficient force so that the resulting frictional resistance to movement of the camming pin 42a is enough to prevent rotation of the actuating shaft 41 by the torsion spring 46. In this brake-releasing position of the actuator 44, the end discs 18—18a are held apart sufficiently to release the brake, although there must still be a slight gap between the armature 27 and the electromagnet 28—30.

As previously mentioned, the actuator 44 will remain in its brake-releasing position as long as the electromagnet remains deenergized, since the camming elements 36a and 42a are held together under the pressure transmitted thereto from the disc biasing springs 24 through the end plate 18 and lever 32. However, when the electromagnet 28—30 is energized, the relatively heavy pressure between the camming elements 36a and 42a is relieved due to the fact that the armature 27 is drawn through the remaining small gap between this armature and the electromagnet, so that the force of the disc biasing springs 24 is now opposed by the action of the electromagnet on the armature 27. In other words, the end disc 18 is now held in the brake-releasing position against springs 24 independently of the camming elements 36a and 42a. As a result of this release of pressure between the camming elements 36a and 42a, the torsion spring 46 automatically returns the actuator 44 to this brake-setting position, whereby the brake is automatically restored to full control by the electromagnet.

With the brake construction as described, it will be observed that the stops 25 can be adjusted to vary the gap between the armature 27 and the electromagnet 28—30, as for the purpose of compensating for wear of the brake linings 22, and this adjustment can be made without affecting the brake-releasing connection between the actuator 44 and the end disc 18. This advantage stems from the fact that the brake-release mechanism, including the actuator 44, lever 32 and actuator return means 46, is carried by the adjacent end disc 18a and hence moves therewith as a unit when the stops 25 are adjusted. It may be necessary to readjust the positions of the release pins 35 when the stops 25 are adjusted for lining wear.

The brake may be provided with a cover 48 seated against the supporting ring 16 and through which the actuating shaft 41 extends to the knob 44 outside the cover. The cover may have holes through which the studs 17 project, so that the cover can be held in place by nuts 49 threaded on the outer ends of the studs.

I claim:

1. An electrically operated brake for a motor-driven shaft, which comprises a series of discs including at least one intermediate disc rotatable with the shaft, the series also including non-rotatable end discs at opposite ends of the series, one of said end discs being movable axially of the shaft and forming an armature, an actuator movably mounted on the second end disc, biasing means urging the first end disc axially toward the second end disc to press the intermediate disc between the end discs and thereby brake the shaft, and electromagnet coacting with said armature and operable when energized to displace said first end disc axially against the force of the biasing means and thereby release the braking action, an operative connection between the actuator and said first end disc for displacing the latter against the force of the biasing means independently of the electromagnet, said connection being movably mounted on the second end disc, the actuator being movable from a brake-setting position to a brake-releasing position to effect said displacement, and means responsive to energizing of the electromagnet for returning the actuator to its brake-setting position.

2. An electrically operated brake according to claim 1, comprising also means for adjusting the position of said second end disc relative to the electromagnet.

3. An electrically operated brake according to claim 1, in which said operative connection includes a pair of camming elements movable relative to said second end disc, one of said elements being movable with the actuator and the second element being movably mounted on said last end disc, said elements being interengaged under pressure from the biasing means transmitted through the first end disc when the electromagnet is deenergized, whereby said pressure between the elements is adapted to hold the actuator frictionally against movement from its brake-releasing position by said returning means.

4. An electrically operated brake according to claim 3, in which said operative connection also includes a lever movably mounted on the second end disc and carrying said second camming element.

5. An electrically operated brake according to claim 1, in which said returning means are mounted on the second end disc.

6. An electrically operated brake for a motor-driven shaft, which comprises a series of discs including at least one intermediate disc rotatable with the shaft, the series also including non-rotatable end discs at opposite ends of the series, one of said end discs being movable axially of the shaft and forming an armature, an actuator and a lever movably mounted on the second end disc, the actuator being movable relative to the lever, biasing means urging the first end disc axially toward the second end disc to press the intermediate disc between the end discs and thereby brake the shaft, an electromagnet coacting with said armature and operable when energized to displace said first end disc axially against the force of the biasing means and thereby release the braking action, an operative connection extending across the intermediate disc from the lever to said first end disc for displacing the latter against the force of the biasing means independently of the electromagnet, the actuator being movable from a brake-setting position to a brake-releasing position to actuate the lever and thereby effect said displacement, and means responsive to energizing of the electromagnet for moving the actuator relative to the lever and to its brake-setting position.

7. An electrically operated brake according to claim 6, comprising also means for adjusting the position of said second end disc relative to the electromagnet.

References Cited in the file of this patent

UNITED STATES PATENTS

| 688,670 | McGeorge | Dec. 10, 1901 |
|---|---|---|
| 829,334 | Hardie | Aug. 21, 1906 |
| 2,512,565 | Hallander | June 20, 1950 |
| 2,700,439 | Hodgson | Jan. 25, 1955 |
| 2,756,846 | LeTourneau | July 31, 1956 |